United States Patent
Blum et al.

(10) Patent No.: US 10,641,498 B2
(45) Date of Patent: May 5, 2020

(54) ANTENNA DEVICE FOR A WIRELESS PROBE SYSTEM OF AN OVEN APPLIANCE

(71) Applicant: Haier US Appliance Solutions, Inc., Wilmington, DE (US)

(72) Inventors: Michael Blum, Louisville, KY (US); James Lee Armstrong, Louisville, KY (US); Gregory Francis Gawron, Sr., Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 335 days.

(21) Appl. No.: 15/864,021

(22) Filed: Jan. 8, 2018

(65) Prior Publication Data

US 2019/0212013 A1    Jul. 11, 2019

(51) Int. Cl.
| | | |
|---|---|---|
| F24C 7/08 | (2006.01) |
| G01K 1/02 | (2006.01) |
| G01K 7/16 | (2006.01) |
| H01Q 1/38 | (2006.01) |
| H01Q 1/02 | (2006.01) |
| H01Q 9/38 | (2006.01) |
| H01Q 1/52 | (2006.01) |

(52) U.S. Cl.
CPC ............. *F24C 7/085* (2013.01); *G01K 1/024* (2013.01); *G01K 7/16* (2013.01); *H01Q 1/38* (2013.01); *G01K 2207/06* (2013.01); *H01Q 1/02* (2013.01); *H01Q 1/52* (2013.01); *H01Q 9/38* (2013.01)

(58) Field of Classification Search
CPC ......... F24C 7/085; F24C 15/006; H01Q 1/38; H01Q 1/52; H01Q 9/38; H01Q 1/02; H01Q 9/30; H01Q 1/44; G01K 7/16; G01K 1/024; G01K 2207/06
See application file for complete search history.

(56) References Cited

U.S. PATENT DOCUMENTS

| | | | | |
|---|---|---|---|---|
| 3,551,919 A * | 1/1971 | Forbes | ............... | E03C 1/057 |
| | | | | 4/623 |
| 5,043,547 A * | 8/1991 | Lee | ............... | H05B 6/6411 |
| | | | | 219/712 |
| 8,222,578 B2 | 7/2012 | Beier | | |
| 8,930,160 B2 | 1/2015 | Wall et al. | | |
| 2006/0219705 A1* | 10/2006 | Beier | ............... | G01K 11/265 |
| | | | | 219/627 |
| 2010/0012645 A1* | 1/2010 | Baier | ............... | G01K 1/024 |
| | | | | 219/413 |
| 2014/0137751 A1* | 5/2014 | Bellm | ............... | G01K 1/024 |
| | | | | 99/342 |
| 2016/0190868 A1* | 6/2016 | Shao | ............... | H01Q 21/065 |
| | | | | 307/149 |
| 2017/0187091 A1* | 6/2017 | Acker | ............... | F24C 7/085 |
| 2018/0351232 A1* | 12/2018 | Nivala | ............... | G01K 1/024 |

FOREIGN PATENT DOCUMENTS

EP    2116829 A1    11/2009

* cited by examiner

*Primary Examiner* — Donnell A Long
(74) *Attorney, Agent, or Firm* — Dority & Manning, P.A.

(57) ABSTRACT

An oven appliance is provided that includes an antenna device for a wireless probe system. In one exemplary aspect, the antenna device includes features that allow the antenna device to function as an antenna for the wireless probe system as well as an oven cavity air temperature sensing device.

20 Claims, 5 Drawing Sheets

ANTENNA DEVICE FOR A WIRELESS PROBE SYSTEM OF AN OVEN APPLIANCE

FIELD OF THE INVENTION

The present subject matter relates generally to cooking appliances, and more particularly to oven appliances having wireless probe systems.

BACKGROUND OF THE INVENTION

Conventional residential and commercial oven appliances generally include a cabinet that defines a cooking chamber for receipt of food items for cooking. Heating elements are positioned within the cooking chamber to provide heat to food items located therein. The heating elements can include, for example, radiant heating elements, such as a bake heating assembly positioned at a bottom of the cooking chamber and/or a broil heating assembly positioned at a top of the cooking chamber.

When cooking certain food items, it may be important to check or monitor the temperature within the cooking chamber, as well as the temperature of the food item, e.g., in order to ensure the food item is adequately cooked. As such, certain oven appliances include a temperature sensor for sensing the temperature within the cooking chamber. For example, the temperature sensor can be a resistance temperature detector (RTD), thermistor, or thermocouple located within a conductive sheath that extends into the cooking chamber. The temperature sensor is typically electrically insulated from the temperature sensor housing. Moreover, certain oven appliances include a probe system that generally includes a wireless temperature probe configured for insertion into a food item for sensing the food item's temperature, an antenna that sends signals to and receives signals from the wireless temperature probe, and a controller in communication with the antenna to interpret the signals such that the food item's temperature may be displayed or communicated to a user. The antenna of such probe systems typically extends into the cooking chamber so that a strong signal path exists between the antenna and the wireless temperature probe.

While such probe systems may accurately detect and display the temperature of food items within the cooking chamber, such probe systems present a number of challenges. On one hand, the antenna may obstruct the cooking space if the antenna is not placed in the extremities of the cooking chamber. On the other hand, if the antenna is placed within the extremities of the cooking chamber, the signal between the wireless temperature probe and the antenna may be obstructed. Further, to extend an antenna into the cooking chamber or oven cavity, tooling modifications for antenna mounting may be required. In addition, by adding an antenna to the oven appliance, part count and cost of the oven appliance is increased. Moreover, as antennas of such probe systems typically extend into the cooking chamber, such antennas may be visible to consumers during access of the cooking chamber, which is an appearance concern for some consumers. Solutions to remove such antennas from view have been accomplished by placing the antenna in or behind a light cover or behind a convection fan cover. Such solutions remove the antenna from view of the consumer, but fail to reduce part count and cost, require tooling modifications, and place obstructing objects between the antenna and the wireless probe.

Accordingly, an appliance having an antenna for a probe system that addresses one or more of the challenges noted above would be useful.

BRIEF DESCRIPTION OF THE INVENTION

Generally, the present disclosure provides an antenna device for a probe system of an oven appliance. In one exemplary aspect, the antenna device includes features that allow the antenna device to function as an antenna for the probe system as well as an oven cavity air temperature sensing device. Additional aspects and advantages of the invention will be set forth in part in the following description, or may be obvious from the description, or may be learned through practice of the invention.

In one exemplary embodiment of the present disclosure, an oven appliance is provided. The oven appliance includes a cabinet defining an oven cavity and a heat source disposed within the oven cavity. The oven appliance also includes an antenna device mounted to the cabinet. The antenna device includes an outer sheath defining an interior volume and formed of a conducting material, the outer sheath extending between a first end and a second end and forming a predetermined tuned length, the first end extending into the oven cavity. Further, the antenna device includes a temperature sensor disposed within the interior volume of the outer sheath and positioned within the oven cavity, wherein the temperature sensor is electrically isolated from the outer sheath. The antenna device also includes a ground cylinder disposed about the outer sheath. In addition, the antenna device includes a dielectric sleeve disposed between the outer sheath and the ground cylinder, wherein the outer sheath is electrically isolated from the ground cylinder by the dielectric sleeve.

In another exemplary embodiment of the present disclosure, an oven appliance is provided. The oven appliance includes a cabinet defining an oven cavity and a heat source disposed within the oven cavity. The oven appliance also includes an antenna device. The antenna device includes an outer sheath tuned to a predetermined frequency and defining an interior volume, the outer sheath extending between a first end and a second end, the first end extending inside the oven cavity and the second end extending outside of the oven cavity. The antenna device further includes a temperature sensor disposed within the interior volume of the outer sheath and positioned within the oven cavity, wherein the temperature sensor is electrically isolated from the outer sheath. In addition, the antenna device includes a ground cylinder having a length and disposed about the outer sheath, the ground cylinder extending between a first end and a second end, the first end extending inside the oven cavity and the second end extending outside of the oven cavity. Moreover, the antenna device includes a mounting bracket for mounting the antenna device to the cabinet, wherein the mounting bracket is attached to and electrically connected with the ground cylinder. Further, the antenna device includes a dielectric sleeve disposed between the outer sheath and the ground cylinder and extending along at least the length of the ground cylinder, wherein the outer sheath is electrically isolated from the ground cylinder and the mounting bracket by the dielectric sleeve.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
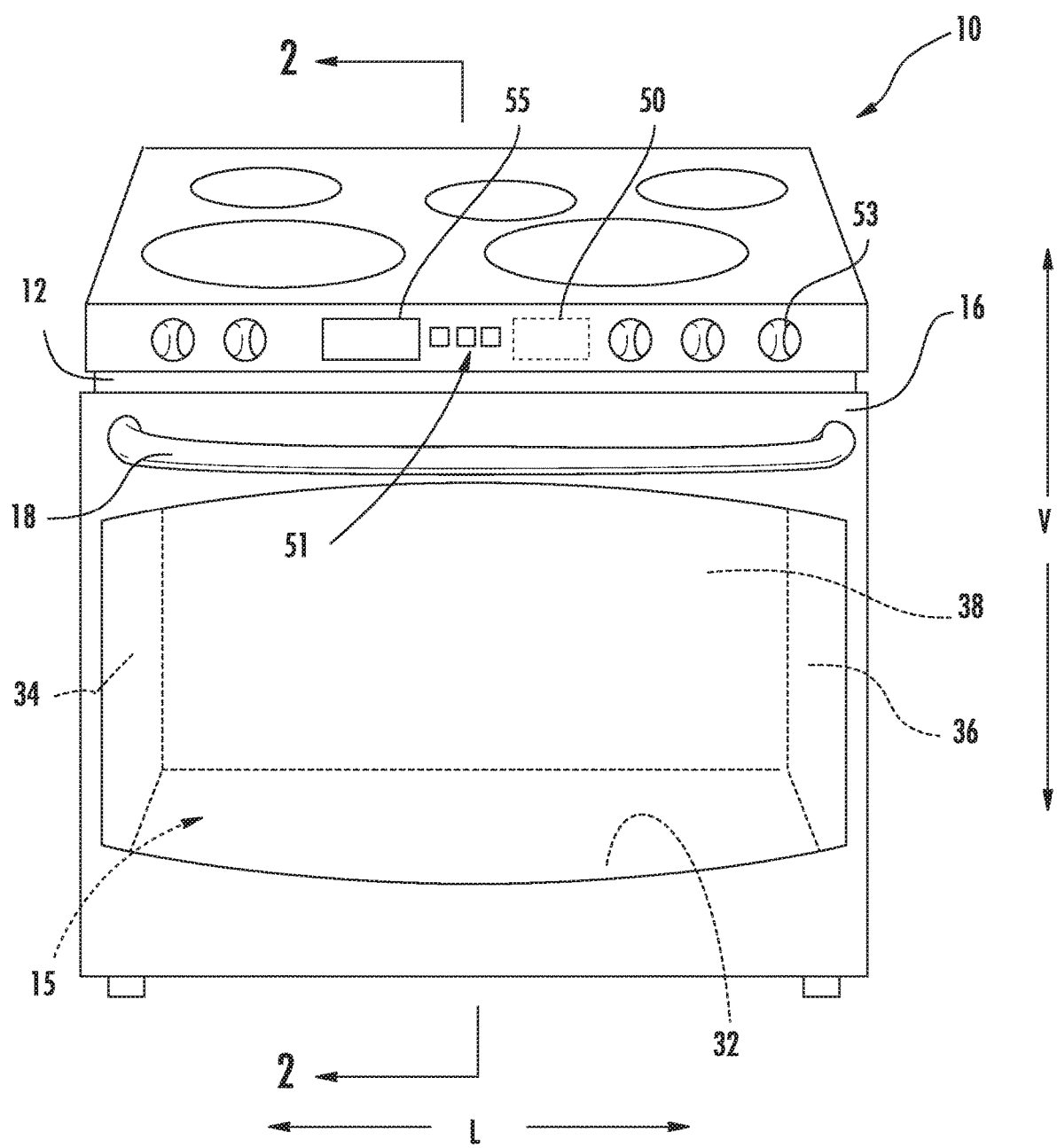
FIG. 1 provides a front perspective view of an oven appliance according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
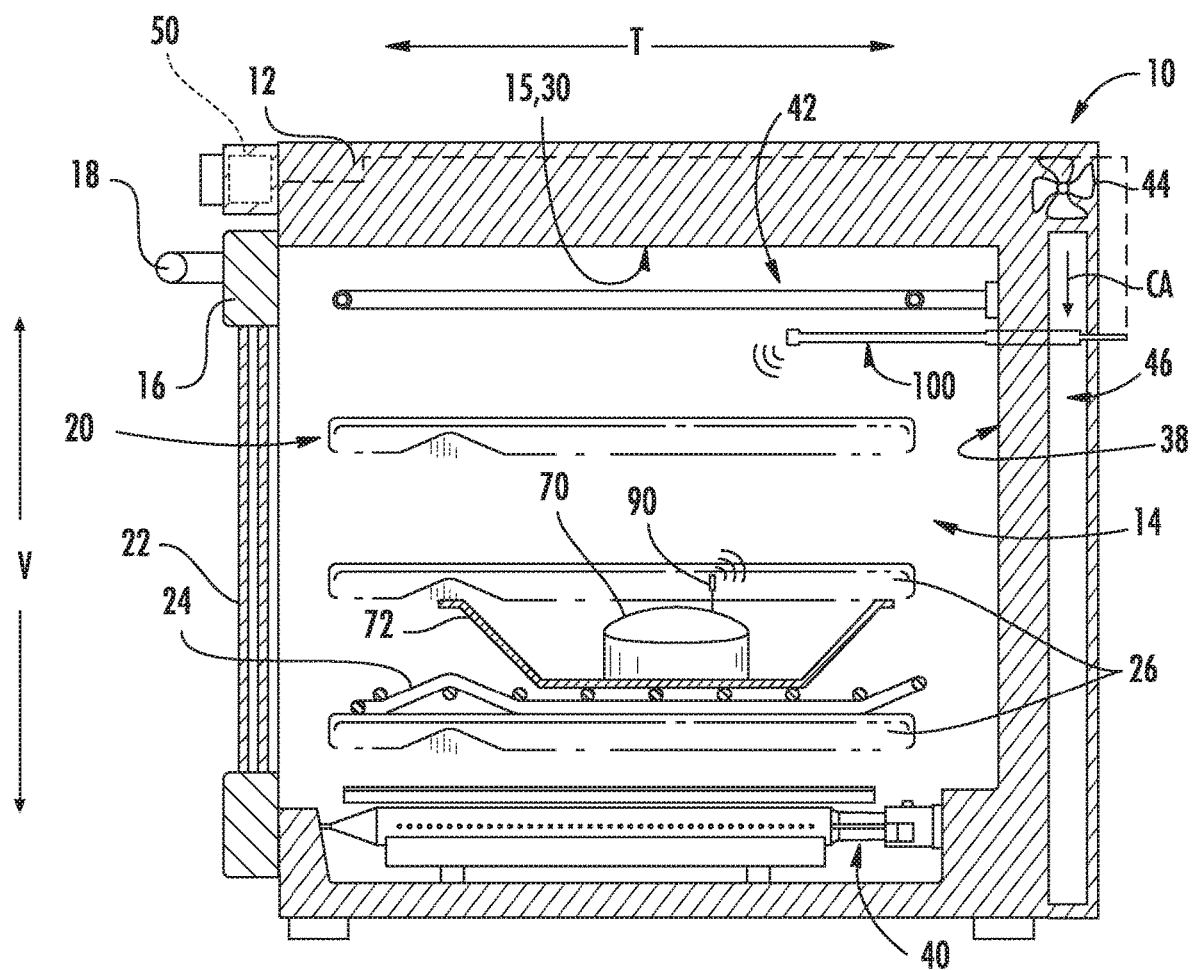
FIG. 2 provides a cross-sectional view of the example oven appliance of FIG. 1 taken along the line 2-2 of FIG. 1, wherein a temperature sensor is in a cavity-enclosed state.

FIG. 1 provides a front perspective view of an exemplary oven appliance 10. FIG. 2 provides a cross-sectional view of oven appliance 10 taken along the line 2-2 of FIG. 1. Oven appliance 10 defines a vertical direction V, a lateral direction L, and a transverse direction T. The vertical direction V, lateral direction L, and transverse direction T are mutually perpendicular and form an orthogonal direction system. As will be understood, oven appliance 10 is provided by way of example only, and the present subject matter may be used in any suitable oven appliance. Thus, the present subject matter may be used with other oven or range appliance configurations, e.g., that define multiple interior cavities for the receipt of food and/or having different configuration than what is shown in FIGS. 1 and 2.

Oven appliance 10 includes an insulated cabinet 12 that defines an oven cavity, such as a cooking chamber 14. More particularly, cooking chamber 14 is defined by various interior surfaces 15 of cabinet 12. Cooking chamber 14 is configured for the receipt of one or more food items (e.g., food item 70) to be cooked. Oven appliance 10 includes a door 16 rotatably mounted to cabinet 12, e.g., with a hinge (not shown). A handle 18 is mounted to door 16 and assists a user with opening and closing door 16 in order to access opening 20 to cooking chamber 14. For example, a user can pull on handle 18 to open or close door 16 and access cooking chamber 14 through opening 20.

Oven appliance 10 can include one or more seals (not shown) between door 16 and cabinet 12 that assist with maintaining heat and cooking fumes within cooking chamber 14 when door 16 is closed as shown in FIG. 2. Multiple parallel glass panes 22 provide for viewing the contents of cooking chamber 14 when door 16 is closed and assist with insulating cooking chamber 14. A baking rack 24 is positioned in cooking chamber 14 for the receipt of one or more food items (e.g., food item 70) and/or utensils (e.g., utensil 72) containing food items. Baking rack 24 is slidably received onto embossed ribs 26 or sliding rails such that rack 24 may be conveniently moved into and out of cooking chamber 14 when door 16 is open.

As shown, various sidewalls of cabinet 12 define cooking chamber 14. For this embodiment, cooking chamber 14 includes a top wall 30 (FIG. 2) and a bottom wall 32 (FIG. 1) which are spaced apart along the vertical direction V. Left sidewall 34 and right sidewall 36 (as defined according to a front view as shown in FIG. 1) extend between top wall 30 and bottom wall 32, and are spaced apart along the lateral direction L. A rear wall 38 extends between the top wall 30 and bottom wall 32 as well as between the left sidewall 34 and right sidewall 36, and is spaced apart from door 16 along the transverse direction T. Cooking chamber 14 is thus defined between the top wall 30, bottom wall 32, left sidewall 34, right sidewall 36, and rear wall 38.

In some embodiments, a gas fueled or electric bottom heating element 40 (e.g., a gas burner or an electric heating element) is positioned in cabinet 12, e.g., at a bottom portion of cabinet 12. Bottom heating element 40 may be used to heat cooking chamber 14 for both cooking and cleaning of oven appliance 10. The size and heat output of bottom heating element 40 can be selected based on the e.g., the size of oven appliance 10.

In yet other embodiments, a top heating element 42 is positioned in cooking chamber 14 of cabinet 12, e.g., at a top portion of cabinet 12. Top heating element 42 is used to heat cooking chamber 14 for both cooking/broiling and cleaning of oven appliance 10. Like bottom heating element 40, the size and heat output of top heating element 42 can be selected based on the e.g., the size of oven appliance 10. In the example embodiment shown in FIG. 2, top heating element 42 is shown as an electric resistance heating element. However, in alternative embodiments, a gas, microwave, halogen, or any other suitable heating element may be used instead of electric resistance heating element 42.

As further depicted in FIG. 2, oven appliance 10 includes a cooling fan 44 in fluid communication with a cooling passage 46 defined by rear wall 38 of cabinet 12. Cooling fan 44 is configured to urge a cooling airflow CA through cooling passage 46 to assist with cooling of the rear portion of oven appliance 10. Further, various electrical components may be positioned along the rear portion of oven appliance 10 and may be cooled by the cooling airflow CA. In this way, the relatively hot temperatures within cooking chamber 14 do not melt or otherwise render the electrical components inoperable.

Oven appliance 10 also includes a controller 50, e.g., configured to control one or more operations of the oven appliance 10. For example, controller 50 may control at least one operation of oven appliance 10 that includes one or more of heating elements 40 and 42. Controller 50 may be in communication (via a suitable wired or wireless connection) with heating element 40, heating element 42, a user interface panel 51, an antenna, a temperature sensing device, and other suitable components of the oven appliance 10, as discussed herein. In general, controller 50 may be operable to configure the oven appliance 10 (and various components thereof) for cooking. Such configuration may be based, for instance, on a plurality of cooking factors of a selected operating cycle or mode, e.g., as selected at user interface panel 51.

By way of example, controller 50 may include one or more memory devices and one or more microprocessors, such as general or special purpose microprocessors operable to execute programming instructions or micro-control code associated with an operating cycle. The memory device (i.e., memory) may represent random access memory such as DRAM, or read only memory such as ROM or FLASH. In one embodiment, the processor executes programming instructions stored in memory. The memory may be a separate component from the processor or may be included onboard within the processor. The memory can store information accessible to processing device, including instructions that can be executed by processing device. Optionally, the instructions can be software or any set of instructions that, when executed by the processing device, cause the processing device to perform operations. For certain embodiments, the instructions include a software package configured to operate appliance 10 and interpret one or more electrical signals. For example, the instructions may include a software package configured to execute commands based on feedback from a probe and antenna device as described more fully below.

Controller 50 may be positioned in a variety of locations throughout oven appliance 10. As illustrated, controller 50 may be located within user interface panel 51 of oven appliance 10 as shown in FIGS. 1 through 2. In such embodiments, input/output ("I/O") signals may be routed between controller 50 and various operational components of oven appliance 10, such as heating element 40, heating element 42, controls 53, display component 55, sensors, alarms, antennas, and/or other components as may be provided. For instance, signals may be directed along one or more wiring harnesses that may be routed through cabinet 12.

In some embodiments, user interface panel 51 includes input components or controls 53, such as one or more of a variety of electrical, mechanical or electro-mechanical input devices. Controls 53 may include rotary dials, push buttons, and touch pads. Controller 50 is in communication with user interface panel 51 and controls 53 through which a user may select various operational features and modes and monitor progress of oven appliance 10. In additional or alternative embodiments, user interface panel 51 includes a display component 55, such as a digital or analog display in communication with controller 50 and configured to provide operational feedback to a user. In certain embodiments, user interface panel 51 represents a general purpose I/O ("GPIO") device or functional block.

As further depicted in FIG. 2, oven appliance 10 includes a probe system. The probe system includes a wireless probe 90, an antenna device 100, and controller 50. As depicted, wireless probe 90 is configured to be inserted into a food item placed within cooking chamber 14, such as meat, and is configured to send signals to and receive signals from antenna device 100. Similarly, antenna device 100 is configured to send signals to and receive signals from wireless probe 90. For this embodiment, wireless probe 90 has a wireless configuration. Thus, to send and receive signals, wireless probe 90 includes a transmission device and a receiving device for communication with antenna device 100. In some embodiments, wireless probe 90 may include a transceiver device that combines transmitting and receiving functionality. For this embodiment, wireless probe 90 and antenna device 100 communicate via radio frequency (RF) signals. Wireless probe 90 and antenna device 100 are tuned to a frequency of interest or predetermined frequency such that they may communicate with one another. For example, wireless probe 90 and antenna device 100 may communicate at a frequency of interest of about four hundred thirty megahertz (430 MHz).

In addition to communication with wireless probe 90, antenna device 100 sends signals to and receives signals from controller 50. For instance, antenna device 100 may receive an RF signal from wireless probe 90 indicative of the internal temperature of the food item in which wireless probe 90 is inserted and then may send a signal to controller 50 such that the signal may be interpreted by controller 50. In this way, oven appliance 10 may communicate the temperature of the food item to a consumer, e.g., by displaying the temperature on display component 55 (FIG. 1). Antenna device 100 may be in communication with controller 50 via a wired or wireless connection. For this embodiment, antenna device 100 is wired with controller 50.

Moreover, for this exemplary embodiment, antenna device 100 is a combination antenna and temperature sensing device. That is, antenna device 100 functions both as an antenna for transmitting/receiving signals to and from wireless probe 90 and controller 50 and as a temperature sensing device for sensing the air temperature of the oven cavity or cooking chamber 14. By combining antenna and temperature sensing functionality into a single device, the part count and cost of the oven appliance may be reduced, the number of objects extending into cooking chamber 14 of oven appliance 10 may be reduced which may be appealing to consumers, and a strong signal path between the antenna and the wireless probe 90 may be achieved. Moreover, where antenna device 100 utilizes an existing temperature sensing structure for the antenna, tooling modifications and/or design changes for oven appliance 10 may be limited or not necessary. Exemplary embodiments of antenna device 100 are provided below.

Figure 3:
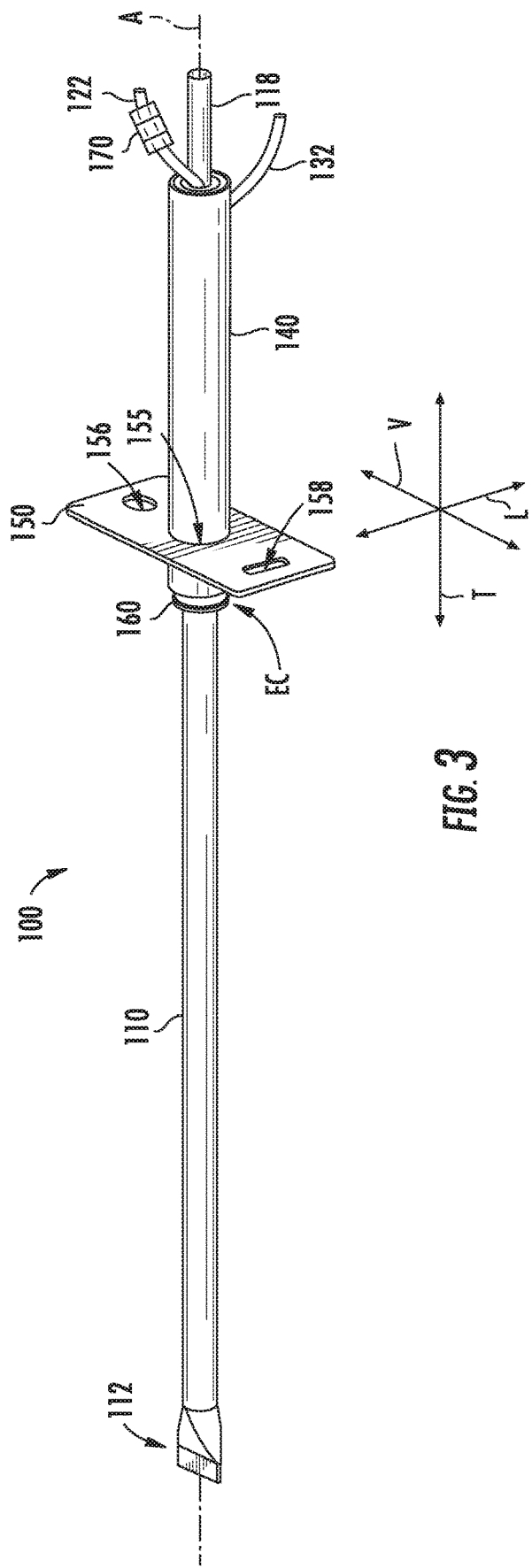
FIG. 3 provides a perspective view of an exemplary antenna device of the oven appliance of FIGS. 1 and 2 according to an exemplary embodiment of the present disclosure.
Figure 4:
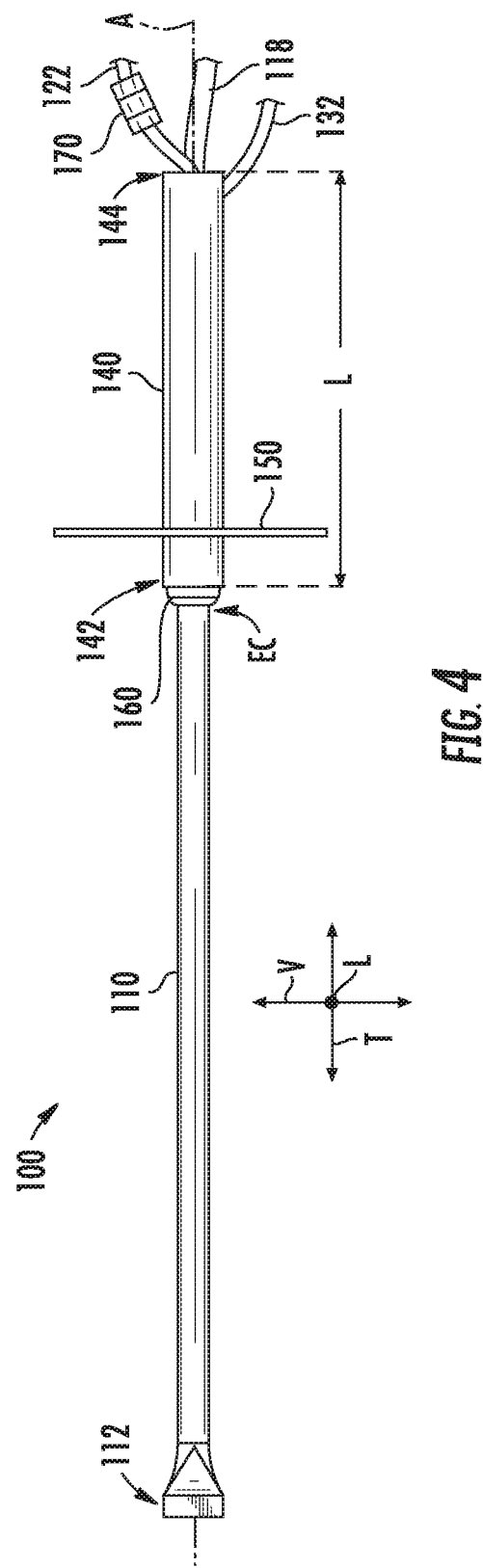
FIG. 4 provides a side view of the antenna device of FIG. 3.
Figure 5:
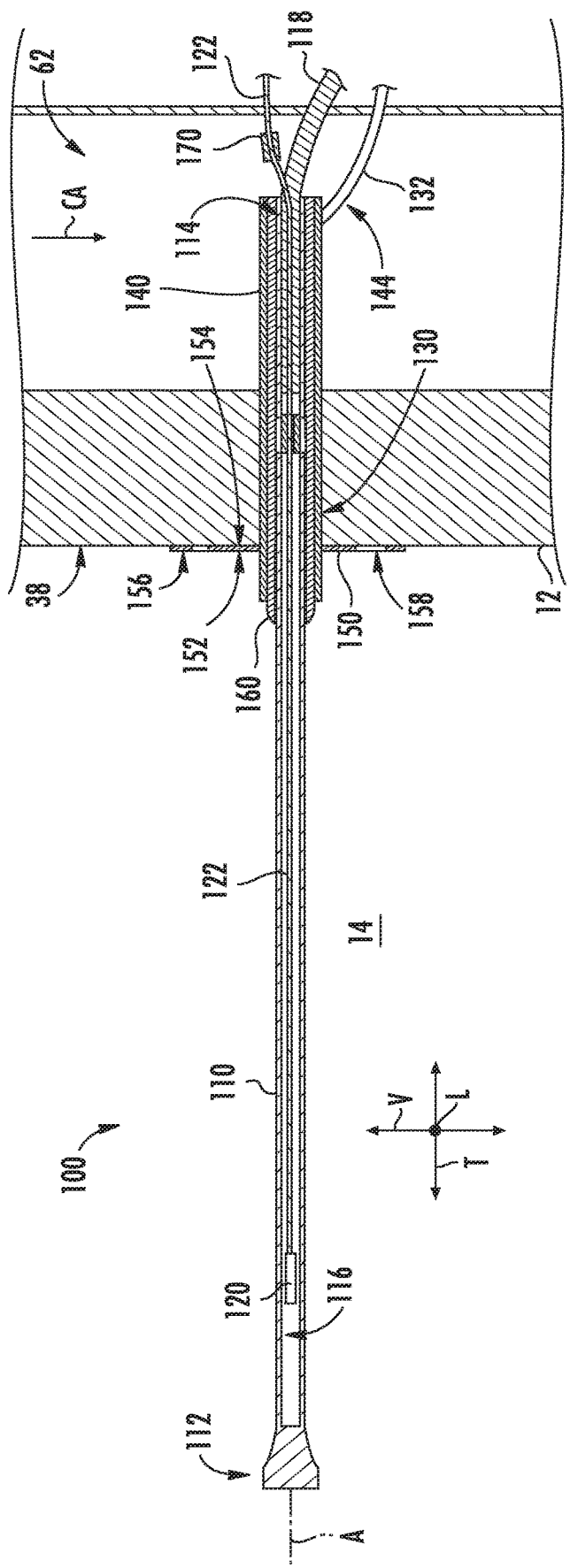
FIG. 5 provides a side, cross-sectional view of the antenna device of FIG. 3.

FIGS. 3, 4, and 5 provide various views of antenna device 100 of oven appliance 10 of FIGS. 1 and 2 according to an exemplary embodiment of the present disclosure. In particular, FIG. 3 provides a perspective view of antenna device 100, FIG. 4 provides a side elevation view thereof, and FIG. 5 provides a cross-sectional view thereof. For this embodiment, antenna device 100 is configured as both an antenna for probe system and as a temperature sensing device for sensing the air temperature of cooking chamber 14. For reference purposes, antenna device 100 defines a central axis A along its longitudinal length.

Antenna device 100 includes an outer sheath 110. Outer sheath 110 serves as the transmitting/receiving element of antenna device 100. That is, outer sheath 110 is the radiating element of the antenna device 100. In some embodiments, outer sheath 110 may be an existing structure of a temperature sensing device or system of oven appliance 10, as noted above.

For this embodiment, outer sheath 110 is formed of a conducting material, such as e.g., stainless steel, and is generally a hollow tube. Thus, outer sheath 110 defines an interior volume 116 (FIG. 5). Outer sheath 110 extends between a first end 112 and a second end 114. More particularly, for this embodiment, outer sheath 110 extends between crimped first end 112 and second end 114 along the central axis A, which in this embodiment is a direction along the transverse direction T. As depicted in FIG. 5, the first end 112 of outer sheath 110 extends into or inside of cooking chamber 14 and second end 114 is positioned outside of or not within cooking chamber 14. By positioning first end 112 within cooking chamber 14, a strong signal path between wireless probe 90 and radiating element outer sheath 110 may be achieved.

As shown particularly in FIG. 5, a temperature sensor 120 is disposed within interior volume 116 defined by outer sheath 110. In this way, temperature sensor 120 is protected by outer sheath 110. That is, outer sheath 110 protects temperature sensor 120 from mechanical shock and damage. Notably, temperature sensor 120 is disposed within outer sheath 110 such that temperature sensor 120 is positioned within cooking chamber 14 when antenna device 100 is assembled within cabinet 12 of oven appliance 10. Accordingly, temperature sensor 120 serves as the temperature sensing element for the cavity air temperature.

Further, temperature sensor 120 is considered in electrical common mode with the RF signals transmitted and received by outer sheath 110 so that signals transmitted and received by outer sheath 110 do not interfere with the temperature readings of temperature sensor 120. Temperature sensor 120 is electrically isolated from outer sheath 110 in order to maintain required primary to secondary electrical isolation. Accordingly, in some exemplary embodiments, the interior walls of outer sheath 110 that define interior volume 116 may include an insulating material disposed thereon or the temperature sensor 120 and its corresponding sensor harness 122 or line may be wrapped or encased in an insulating material to prevent inadvertent interference. Temperature sensor 120 may be any suitable temperature sensing device capable of sensing the air temperature within cooking chamber 14. For example, temperature sensor 120 may be a resistance temperature detector (RTD), thermistor, or thermocouple. For this embodiment, temperature sensor 120 is an RTD temperature sensor.

Antenna device 100 also includes a grounding system or grounding plane 130 (FIG. 5) for grounding antenna device 100. Grounding plane 130 serves as the parasitic or passive element of antenna device 100. Grounding plane 130 modifies the radiation pattern of the RF signals emitted by the radiating element outer sheath 110 to increase the directivity or gain of antenna device 100, and properly grounds antenna device 100 by completing the half wave antenna configuration. For this embodiment, grounding plane 130 includes a ground cylinder 140, a mounting bracket 150, and the wall or part of cabinet 12 to which antenna device 100 is mounted, such as e.g., rear wall 38 of cabinet 12. Moreover, for this embodiment, the grounding plane is electrically connected to an electrical ground by a ground line 132, which may be of the form a ground shield of a coaxial cable. For instance, for this embodiment, ground line 132 is attached to ground cylinder 140 and may extend to the electrical ground. As one example, ground line 132 is attached to ground cylinder 140 by a spot weld. Alternatively, ground line 132 and transmission line 118 may be attached mechanically to ground cylinder 140 and outer sheath 110, respectively, by terminals, crimps, a combination thereof, or other suitable means.

As shown in FIGS. 3, 4, and 5, ground cylinder 140 has a length L (FIG. 4) and is disposed annularly about outer sheath 110. In this way, ground cylinder 140 encloses or encases outer sheath 110 along a portion of its length L. Although ground cylinder 140 is shown as a generally hollow circular cylindrical element, ground cylinder 140 may have any suitable geometric cross section. For instance, ground cylinder 140 may have an oval cross section, a pentagonal cross section, a rectangular cross section, or a triangular cross section orthogonal to the central axis A.

As further depicted, ground cylinder 140 extends between a first end 142 and a second end 144 along the central axis A (FIG. 4), which is a direction along the transverse direction T in this embodiment. As shown in FIG. 5, first end 142 of ground cylinder 140 extends inside or into cooking chamber 14 and second end 144 extends outside of or not within cooking chamber 14. Ground cylinder 140 may be formed of any suitable conducting material, such as e.g., stainless steel. As will be explained further below, ground cylinder 140 not only serves as part of the grounding plane, but also provides a mounting surface to which mounting bracket 150 may be mounted.

For this exemplary embodiment, mounting bracket 150 is a flat, rectangular conducting plate that provides a structure for mounting antenna device 100 to or with oven appliance 10. As shown particularly in FIG. 5, for this embodiment, mounting bracket 150 mounts antenna device 100 to rear wall 38 of cabinet 10. In alternative exemplary embodiments, mounting bracket 150 may mount antenna device 100 along other walls of cabinet 12, such as e.g., one of the left or right sidewalls 34, 36 (FIG. 1). Mounting bracket 150 has a first side 152 and an opposing second side 154 spaced by a transverse thickness. Mounting bracket 150 also has a length extending along the vertical direction V and a width extending along the lateral direction L. Mounting bracket 150 can be formed of any suitable conducting material, such as e.g., stainless steel.

As shown particularly in FIGS. 3 and 5, mounting bracket 150 defines an opening 155 (FIG. 3) that is sized to receive outer sheath 110 and ground cylinder 140. Opening 155 may be sized slightly smaller than the outer diameter of ground cylinder 140 such that ground cylinder 140 is press or interference fit with mounting bracket 150. Additionally or alternatively, in some embodiments, mounting bracket 150 may welded to ground cylinder 140 about the perimeter of opening 155. Other suitable methods for connecting ground cylinder 140 with mounting bracket 150 are contemplated. As mounting bracket 150 and ground cylinder 140 are connected to one another and are both formed of conducting materials in this exemplary embodiment, mounting bracket 150 is electrically connected with ground cylinder 140, and consequently, they both form part of grounding plane 130 as noted above. Mounting bracket 150 also defines one or more mounting openings that allow one or more fasteners (not shown) to secure mounting bracket 150 to rear wall 38. For instance, screws may extend through circular mounting opening 156 and slot mounting opening 158 to secure mounting bracket 150 with rear wall 38, and consequently, antenna device 100 with oven appliance 10. Screws (not shown) may also serve to electrically connect mounting bracket 150 to back wall 38 of cavity 14 such that back wall 38 of cavity 14 may also become part of the grounding plane.

For optimal antenna functionality of antenna device 100, the radiating element, which in this embodiment is electrically conducting outer sheath 110, is electrically isolated or insulated from grounding plane 130, which as noted above, includes ground cylinder 140, mounting bracket 150, rear wall 38, as well as any conducting fasteners that secure mounting bracket 150 with rear wall 38. Accordingly, for this embodiment, antenna device 100 includes a dielectric sleeve 160. As shown, dielectric sleeve 160 is disposed between outer sheath 110 and ground cylinder 140 and extends along at least the length L of ground cylinder 140. In this way, dielectric sleeve 160 electrically isolates outer sheath 110 from ground cylinder 140, and more broadly, dielectric sleeve 160 electrically isolates the transmitting/ receiving outer sheath 110 from grounding plane 130. Furthermore, in addition to electrically isolating radiating element outer sheath 110 from grounding plane 130, dielectric sleeve 160 mechanically couples ground cylinder 140 with outer sheath 110. The dielectric sleeve 160 may be formed of a suitable insulating material, such as e.g., a thermoplastic, an enamel, or a ceramic material. Preferably, dielectric sleeve 160 is formed of insulating material that has adequate dielectric resistance and is able to withstand temperatures of at least 1100° F.

For this embodiment, antenna device 100 is a quarter wave monopole. As noted above, outer sheath 110 is the radiating element of antenna device 100 and grounding plane 130, which includes ground cylinder 140, mounting bracket 150, and rear wall 38 of cabinet 12 in this embodiment, is the passive element of antenna device 100. The radiating element outer sheath 110 is a quarter wavelength long and the other quarter wavelength is found naturally by the RF signals in grounding plane 130. Accordingly, antenna device 100 is a quarter wavelength long monopole antenna. Further, in this exemplary embodiment, the electrical center EC of the antenna is located proximate the end of the dielectric sleeve 160 that is positioned within cooking chamber 14.

Controller 50 is communicatively coupled with antenna device 100. In particular, temperature sensor 120 of antenna device 100 is communicatively coupled with controller 50 via sensor harness 122. In this manner, temperature readings from temperature sensor 120 can be interpreted by controller 50 such that the oven cavity air temperature may ultimately be displayed to a consumer. Further, the radiating element outer sheath 110 is communicatively coupled with controller 50 via a feed or transmission line 118, which may be a coaxial cable, for example. In this way, signals received by outer sheath 110 from wireless probe 90 can be forwarded to controller 50 for interpretation such that the temperature of the food item may be displayed to the consumer. Further, transmission line 118 provides communication between outer sheath 110 and controller 50 so that controller 50 may send signals to outer sheath 110 so that in turn outer sheath 110 can communicate the signals to wireless probe 90. Transmission line 118 may be any suitable feed or transmission line. For instance, transmission line 118 may be a coaxial cable having one or more conducting wires encased within a protective, insulating shell surrounded by a shield conductor. In some embodiments, transmission line 118 is a coaxial cable rated at least up to 400° F. ($\approx 205°$ C.). In some embodiments, transmission line 118 and ground line 132 may be encased within a single coaxial cable. In such embodiments, the outer shield conductor of the coaxial cable acts as ground line 132 and is electrically connected with ground cylinder 140 and the inner conducting wires of the cable act as transmission line 118 and are electrically connected with outer sheath 110.

As shown particularly in FIG. 5, second end 114 of outer sheath 110 extends into cooling passage 62 defined by rear wall 38. Further, as depicted, transmission line 118 is electrically connected with outer sheath 110 outside of cooking chamber 14 and within cooling passage 62. In addition, as shown, sensor harness 122 exits antenna device 100 outside of cooking chamber 14 and within cooling passage 62. That is, sensor harness 122 is fully protected by outer sheath 110 within cooking chamber 14. Further, ground line 132 is electrically connected to and extends from ground cylinder 140 outside of cooking chamber 14 and within cooling passage 62. In this way, the various communication lines and ground line are cooled by the cooling airflow as they extend from antenna device 100. This protects the lines and thermally insulates them from the relatively hot temperatures within cooking chamber 14 during operation of oven appliance 10.

As further depicted, a choke device 170 is disposed about sensor harness 122 to prevent electromagnetic and radio frequency interference (EMI/RFI) from disrupting antenna device's antenna functionality. For this embodiment, choke device 170 is disposed about sensor harness 122 proximate second end 114 of outer sheath 110 and is a ferrite bead. In this way, choke device 170 prevents propagating RF signals from traveling any further than choke device 170 and isolates the lines from EMI and RFI. Accordingly, the radiating element outer sheath 110 is prevented from being detuned by sensor harness 122, or more particularly, the electrical signals propagating therethrough. Moreover, choke device 170 may prevent the signals through outer sheath 110 from disrupting or interfering with signals propagating through sensor harness 122.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance, comprising:
   a cabinet defining an oven cavity;
   a heat source disposed within the oven cavity; and
   an antenna device mounted to the cabinet, the antenna device comprising:
      an outer sheath defining an interior volume and formed of a conducting material, the outer sheath extending between a first end and a second end and forming a predetermined tuned length, the first end extending into the oven cavity;
      a temperature sensor disposed within the interior volume of the outer sheath and positioned within the oven cavity, wherein the temperature sensor is electrically isolated from the outer sheath;
      a ground cylinder disposed about the outer sheath; and
      a dielectric sleeve disposed between the outer sheath and the ground cylinder, wherein the outer sheath is electrically isolated from the ground cylinder by the dielectric sleeve.

2. The oven appliance of claim 1, wherein the antenna device is a quarter wave monopole antenna, and wherein the outer sheath is a radiating element of the antenna device and a grounding plane is established within the ground cylinder.

3. The oven appliance of claim 2, wherein the outer sheath is approximately a quarter wavelength long.

4. The oven appliance of claim 2, wherein the grounding plane is a quarter wavelength long.

5. The oven appliance of claim 1, wherein the cabinet comprises a rear wall, and wherein the antenna device is mounted to the rear wall of the cabinet.

6. The oven appliance of claim 5, further comprising:
   a cooling fan;

wherein the rear wall defines a cooling passage in fluid communication with the cooling fan, and wherein the second end of the outer sheath extends into the cooling passage.

7. The oven appliance of claim 6, further comprising:
a controller communicatively coupled with the antenna device, and wherein a transmission line communicatively couples the outer sheath with the controller, and wherein the transmission line is electrically connected with the outer sheath within the cooling passage.

8. The oven appliance of claim 1, wherein the antenna device is mounted and electrically connected to the cabinet by a mounting bracket, and wherein the mounting bracket is mechanically and electrically connected with the ground cylinder and is electrically isolated from the outer sheath.

9. The oven appliance of claim 1, further comprising:
a transmission line electrically connected with the outer sheath; and
a controller communicatively coupled with the antenna device, wherein the controller is communicatively coupled with the antenna device via a transmission line and a sensor harness, and wherein a choke device is disposed about the sensor harness.

10. The oven appliance of claim 9, wherein the choke device is disposed about the sensor harness proximate the second end of the outer sheath.

11. The oven appliance of claim 9, wherein the choke device is a ferrite bead.

12. The oven appliance of claim 1, wherein a ground line is electrically connected to the ground cylinder.

13. An oven appliance, comprising:
a cabinet defining an oven cavity;
a heat source disposed within the oven cavity; and
an antenna device, comprising:
an outer sheath tuned to a predetermined frequency and defining an interior volume, the outer sheath extending between a first end and a second end, the first end extending inside the oven cavity and the second end extending outside of the oven cavity;
a temperature sensor disposed within the interior volume of the outer sheath and positioned within the oven cavity, wherein the temperature sensor is electrically isolated from the outer sheath;
a ground cylinder having a length and disposed about the outer sheath, the ground cylinder extending between a first end and a second end, the first end extending inside the oven cavity and the second end extending outside of the oven cavity;
a mounting bracket for mounting the antenna device to the cabinet, wherein the mounting bracket is attached to and electrically connected with the ground cylinder; and
a dielectric sleeve disposed between the outer sheath and the ground cylinder and extending along at least the length of the ground cylinder, wherein the outer sheath is electrically isolated from the ground cylinder and the mounting bracket by the dielectric sleeve.

14. The oven appliance of claim 13, wherein the temperature sensor is a resistance temperature detector (RTD).

15. The oven appliance of claim 13, further comprising:
a controller;
a transmission line communicatively coupling the outer sheath with the controller;
a sensor harness communicatively coupling the temperature sensor with the controller; and
a ground line electrically coupling the ground cylinder with a ground source.

16. The oven appliance of claim 15, wherein the transmission line is electrically connected to the outer sheath outside of the oven cavity and the sensor harness exits the antenna device outside of the oven cavity.

17. The oven appliance of claim 15, wherein the transmission line is a coaxial cable.

18. The oven appliance of claim 13, further comprising:
a controller, the controller communicatively coupled with the antenna device and comprising a transceiver device configured to interpret one or more signals received from the outer sheath of the antenna device.

19. The oven appliance of claim 13, wherein the outer sheath is a radiating element of the antenna device and a grounding plane is comprised of the ground cylinder and the mounting bracket, wherein the grounding plane is a passive element of the antenna device.

20. The oven appliance of claim 13, wherein the cabinet comprises a rear wall, and wherein the antenna device is mounted to the rear wall of the cabinet, the oven appliance further comprising:
a controller;
a transmission line communicatively coupling the controller with the outer sheath of the antenna device; and
a cooling fan;
wherein the rear wall defines a cooling passage in fluid communication with the cooling fan, and wherein the second end of the outer sheath extends into the cooling passage such that the transmission line is electrically connected with the outer sheath within the cooling passage.

* * * * *